United States Patent Office 3,632,847
Patented Jan. 4, 1972

3,632,847
PROCESS FOR POLYMERIZING FLUORINE-CONTAINING MONOMERS USING ACIDS OF METALS AS CATALYST
Robert Hartwimmer, Burghausen-Salzach, Germany, assignor to Farbwerke Hoechst Aktiengesellschaft vormals Meister Lucius & Bruning, Frankfurt am Main, Germany
No Drawing. Filed Feb. 25, 1969, Ser. No. 802,242
Claims priority, application Germany, Mar. 12, 1968, P 17 20 801.4
Int. Cl. C08f 3/20, 15/06
U.S. Cl. 260—92.1                     3 Claims

ABSTRACT OF THE DISCLOSURE

The present invention is related to a process for the manufacture of polymers and copolymers of fluorine-containing olefins at relatively low temperatures in the range of from 0 to 50° C. and at atmospheric or slightly elevated pressure. The polymerization is catalyzed by acids or salts of acids of subgroup V to VII metals or by compounds which are converted into such acids under the reaction conditions.

The present invention relates to fluorine-containing polymers and to a process for their manufacture using as catalysts compounds of metals of subgroups V to VII of the Periodic Table.

It is known from the relevant literature that the polymerization of fluoro-olefins is usually initiated by means of free radicals. At elevated temperatures the polymerization can be initiated, for example, by radicals formed by decomposition of peroxides, persulfates, perphosphates, percarbonates or organic per-acids and azo compounds. Still further, it has been proposed to produce the radicals required to start the polymerization at low temperature with the aid of special redox systems. A commonly used redox system consists, for example, of an alkali metal persulfate in combination with an alkali metal hydrogensulfite.

According to the polymerization activity of the individual olefins used, it is necessary in most cases and usual in practice considerably to increase the monomer concentration in the mostly aqueous medium by operating under a high pressure, whether to enforce the beginning of polymerization or to increase the available amount of monomer in the polymerization mixture to an extent such that economically favorable space-time-yields can be obtained. The polymerization period can be shortened further by raising the polymerization temperature. To carry through these steps considerably higher expenses of apparatus, construction and material are necessary. The stronger safety provisions prescribed for operations under high pressure give rise to further important costs. Moreover, it is often impossible to perform polymerization processes under pressure in a continuous manner so that they are not very economic. Furthermore, the polymerization conditions, especially in the case of tetrafluoroethylene, are then within the possible range of decomposition ($C_2F_4 \rightarrow CF_4+C$) so that sudden explosive decompositions must be taken into account, which necessitate further additional safety provisions.

The conditions are similar in the known processes and ways for the manufacture of copolymers of fluorine-containing olefins.

To mention the best-known fluoroolefins, tetrafluoroethylene is generally polymerized under about 10 to 30 atmospheres gauge and at 100° C., vinyl fluoride under 30 to 100 atmospheres gauge and at 80 to 100° C., vinylidene fluoride under 30 to 70 atmospheres gauge and at 100 to 150° C. To produce copolymers of tetrafluoroethylene with vinyl chloride pressures in the range of from 140 to 200 atmospheres and temperatures of 30 to 100° C. have been proposed, whereas copolymers of tetrafluoroethylene with hexafluoropropylene are produced under a pressure of from 40 to 50 atmospheres and at temperatures of from 90 to 125° C. The conditions for copolymers of vinylidene fluoride and hexafluoropropylene are similar.

It has also been proposed to initiate the polymerization by high energy ionizing radiation, but this method is not very effective and requires high expenditure pertaining to apparatus and safety provisions so that it is not yet used on an industrial scale. In other processes there are used difficultly accessible catalysts, catalysts that are sensitive to air and moisture or even inflammable, such as, for example, xenon fluorides, oxygen fluorides, cerium fluorides, manganese fluorides, chromium fluorides and lead fluorides or aluminum-alkyls, which necessitate anhydrous, expensive organic or inorganic solvents. Furthermore, it has been proposed to polymerize tetrafluoroethylene in the gaseous phase in the presence of solid acid compounds of silicon, boron, aluminum and chromium. In this case the total amount of catalyst remains in the polymer whereby the product obtained becomes unsuitable for many fields of application.

It has, therefore, been desirable to develop a process for the manufacture of polymers and copolymers of fluorine-containing olefins under low pressures and at low temperatures in simple apparatus with readily accessible catalysts and to obtain the polymers with high space-time-yield in aqueous phase in economic manner, that is to say on a large scale.

The present invention provides a process for the manufacture of fluorine-containing polymers by polymerizing or copolymerizing fluorine-containing olefins in aqueous phase, which comprises using as polymerization catalyst acids of metals of subgroups V to VII of the Periodic Table or the salts thereof or such compounds as are transformed into the said acids under the polymerization conditions.

Monomers that can be used in the polymerization or copolymerization of the invention are, for example, perfluorinated olefins, preferably those having 2 to 12 carbon atoms, especially tetrafluoroethylene, hexafluoropropylene, cycloiso-, and n-perfluorobutylenes and compounds of analogous constitution. It is also possible to polymerize according to the invention olefins which contain, in addition to fluorine, one or several other halogen atoms in the molecule, for example trifluorochloroethylene and 1,1-dichloro-2,2-difluoroethylene or like compounds. Still further, hydrogen-containing fluoroolefins, for example trifluoroethylene, 1-chloro-2,2-difluoroethylene, vinylidene fluoride or vinyl fluoride—to mention the best known representatives of this class of compounds—can be homo- or copolymerized by the process of the invention.

Suitable catalysts in the process of the invention are salts, preferably water-soluble salts of acids of the metals of subgroups V to VII of the Periodic Table, i.e. salts of vanadic acid, chromic acids and alkali metal chromates and dichromates, salts of molybdic acid and tungstic acid, and—with particular advantage—soluble salts of the different manganic acids, such as potassium permanganate, ammonium and potassium manganate, sodium hypomanganate, and salts of manganous acid. Soluble salts of perrhenic acid, for example alkali metal perrhenates, and salts of rhenic acid and of rhenous acid may also be used as catalyst.

Alternatively, the free acids of the metals of subgroups V to VII of the Periodic Table can be used as catalysts provided that they are capable to exist in an aqueous acid medium.

Compounds which may be transformed under the polymerization conditions into the compounds specified above are, for example, the anhydrides of the aforesaid acids, the halides thereof and other readily hydrolizable compounds of the specified metals, such as chromium trioxide, manganese heptoxide, rhenium heptoxide, vanadium oxichloride, chromyl chloride, and chromyl fluoride.

The catalysts are used—according to their properties and the oxidation stage of the central complex metal ion—partially in the form of the specified individual compounds, partially in the form of a combination of two or more of the aforesaid salts, acids or derivatives thereof. In the latter case all components may be compounds of the same basic element in the various oxidation stages, or they may derive from acids of different metals of subgroups V to VII of the Periodic Table. In this case, too, the metals may be present in different oxidation stages. It is advantageous to use cheap and readily accessible substances such as potassium permanganate, potassium manganate, ammonium dichromate, potassium chromate, that is to say products which are available on the market in a sufficient purity.

Considering the purity and the properties of the polymers to be produced, it is advantageous to use the acid catalysts in the aqueous polymerization medium in an amount of from 0.1 to 100 p.p.m., preferably 2 to 10 p.p.m., calculated on the aqueous polymerization medium i.e. on the average 5 miligrams per liter. The catalyst or the catalyst mixture can be added at the beginning of polymerization or the catalyst solution can be added continuously in dosed quantities during the polymerization, the latter method being advantageous with large batches.

When the polymerization is carried out in the form of a suspension polymerization agents to salt out or precipitate the polymer are added to the polymerization mixture, which agents are necessary for the formation of a granular, fine and freely flowing polymer and simultaneously adjust the pH of the polymerization mixture to a value below 7, preferably in the range of from 4 to 5.

For this purpose salts such as ammonium fluoride, ammonium chloride, ammonium sulfate, ammonium dihydrogenphosphate, sodium dihydrogen phosphate have proved to be especially advantageous. The polymerization mixture should contain the aforesaid compounds in a concentration of about 0.01 to 0.02 mole.

The monomers are added until the polymerization mixture contains 15 to 20% by weight of solid polymer.

When dispersions are produced, the usual amounts of dispersing agents and dispersion auxiliaries are added to the water, for example white oils, paraffins, long chain perfluorinated carboxylic acids or the salts thereof. Simultaneously the necessary acid pH range is adjusted.

Owing to the high activity of the catalysts of the invention, which is especially pronounced at low temperatures and low pressure, it is now possible to obtain the space-time-yields obtainable by a conventional process at considerably higher temperatures and under high pressure, at a temperature in the range of from 0 to 50° C., preferably 5 to 20° C. at atmospheric pressure or with a monomer pressure that is slightly thereabove. Tetrafluoroethylene and also trifluorochloroethylene, for example, polymerize with the catalyst of the invention at a temperature of from 5 to 10° C. even under a subatmospheric monomer pressure. In practice, however, the polymerization of these monomers is generally performed at atmospheric pressure or slightly elevated pressure, for example in the range of from 0.5 to 3 atmospheres gauge.

Under comparable conditions of pressure, temperature, agitation and concentration, some of the catalysts of the invention are 10 to 20 times more effective than the conventional catalyst consisting of persulfate and bisulfite.

Fluoro-olefins having a poor polymerization activity can be polymerized and copolymerized according to the invention at substantially reduced pressures and temperatures with satisfactory space-time-yields.

Owing to the advantages of the process of the invention, which also permit a continuous polymerization, the fluorine-containing polymers can be produced in a very economic manner. Operating practically without the application of pressure means considerable savings of apparatus and safety provisions. The safety is improved because under the conditions of the present process a spontaneous decomposition of the tetrafluoroethylene need not to be feared. The operators can stay in the immediate neighborhood of the polymerization apparatus, control the reaction and, if necessary, look after the apparatus during polymerization.

In the laboratory, the polymerization of tetrafluoroethylene according to the invention can be carried out in a glass flask provided with stirred, dropping funnel and gas inlet pipe. On a larger scale, simple enamelled vessels with stirrer or suitable plastic containers also equipped with stirrer, for example of polypropylene, may be used. When the process is to be carried out in continuous manner slim, high columns of enamelled tubes, plastic tubes or tubes lined with a plastic material, are preferably used, which tubes are provided with full-length shafts with stirring means. In the latter case, the polymerization medium and the catalyst are continuously pumped in at the lower end of the tube and the monomer or monomer mixture are introduced at suitable heights of the column. The finished polymer is withdrawn over the upper rim of the polymerization vessel which has a sufficient height and further treated, for example, washed, ground and dried.

A slight superatmospheric pressure of about 0.5 to 1 atmosphere gauge, which is advantageous in the present process, automatically produces the liquid column of the polymerization medium.

In contradistinction to known processes, in the process of the invention the polymerization vessels remain free from deposits of any kind on the walls, baffles, or stirrer.

Owing to the special manufacturing conditions, the polymers prepared according to the invention often have properties that are especially favorable for some fields of application and that could not be obtained until now by known polymerization processes, for example the substantial lack of pores with sliced films and special dielectric properties.

The following examples serve to illustrate the invention but they are not intended to limit it thereto.

EXAMPLE 1

3 grams of ammonium chloride and 2,500 cc. of desalted water were filled into a 4 liter glass flask provided with an effective stirrer, a graduated dropping funnel with pressure balance, a gas inlet tube and an elbow pipe connected with an off gas pipe into the open air over a relief pressure valve with 15 cm. of mercury (0.2 atmosphere gauge), and water cooling. The dropping funnel was charged with a solution 40 milligrams of potassium permanganate in 50 milliliters of water. A weak current of nitrogen was passed for 10 minutes through the apparatus whilst stirring and then 15 milliliters of the catalyst solution were allowed to flow into the glass flask. The nitrogen current was switched off and tetrafluoroethylene was introduced instead. The violet color of the solution rapidly turned to a green to brown tint. The temperature in the flask amounted to 18° C. After a period of induction of 10 to 12 minutes the first signs of a gas absorption were observed whereupon another 15 milliliters of the catalyst solution were rapidly added. A strong absorption of monomer set in and the limpid solution became turbid and granules of a white polymer separated. The flask was then cooled with flowing water. After some time the absorption of gas subsided and the remaining 20 milliliters of the catalyst solution were slowly added drop by drop. The absorption of gas strongly increased at once. After a period of reaction of 40 minutes a considerable amount of solid polymer had separated in the flask and the polymerization was interrupted by introducing nitrogen instead of monomer. The polymer was separated from the polymerization medium, washed several times and dried. 343 grams of fine-grained polytetrafluoroethylene were obtained corresponding to a space-time-yield of about 206 grams per liter an hour.

EXAMPLE 2

A stirred vessel having a capacity of 15 liters and internally lined with enamel was charged with 9 liters of desalted water and 12 grams of sodium dihydrogen phosphate and the impeller was set in motion with a speed of 400 revolutions per minute. In order quantitatively to remove the oxygen from the apparatus pure nitrogen was forced in 7 times under a pressure of 2.4 atmospheres gauge with intermediate pressure release. Finally, the apparatus was scavenged twice in the same manner with pure tetrafluoroethylene.

The maintenance of pressure and temperature regulation were fully automatic and recorded for control.

While maintaining in the vessel a monomer pressure of 2.5 atmospheres gauge one third of the catalyst solution consisting of 40 milligrams of potassium permanganate in 600 milliliters of water was pumped into the vessel by means of a dosing pump. After an induction period of 15 minuutes the remaining two thirds of the potassium permanganate solution were added whereupon a strong absorption of monomer set in at once. When the pressure had dropped to 1.1 atmospheres gauge 1350 grams of tetrafluoroethylene were introduced over a measuring diaphragm. The pressure was maintained at 1.1 atmospheres gauge and the temperature was automatically adjusted to 25° C. During a polymerization period of 55 minutes absorption maxima of about 240 grams per liter per hour were reached. The polymer obtained was processed and dried. 1,300 grams of polytetrafluoroethylene were obtained having the following properties: density 2.161 g./cc., tensile strength 288 kp./cm.$^2$, elongation at break 440%, transparency 47.7%, thermostability 0.05% (loss in weight when heated for 16 hours at 380°). The average space-time-yield was approximately 150 grams per liter an hour.

EXAMPLE 3

In a substantially automatic polymerization plant an enamelled vessel having a capacity of 150 liters was charged with 90 liters of desalted water. 132 grams of ammonium chloride were dissolved in the water whilst stirring. The automatic temperature regulation was adjusted to an internal temperature in the vessel of 14 to 16° C. and the stirrer was rotated at a speed of 173 revolutions per minute. As catalyst 500 milligrams of potassium permanganate were dissolved in 4 liters of water. The apparatus was scavenged with pure nitrogen as described in Example 2 by forcing in with subsequent pressure release until the vessel was free from oxygen. This operation was repeated twice with tetrafluoroethylene. Under a monomer pressure of 3 atmospheres gauge 1 liter of the potassium permanganate solution was rapidly added. After about 10 minutes the remaining 3 liters of permanganate solution were added to the polymerization mixture at a rate such that approximately 1 liter was consumed per hour. After 20 minutes the absorption of gas increased, perceptible by the drop in pressure in the vessel. After the pressure had dropped to 1.2 atmospheres gauge within a short period of time, the automatic pressure regulation was turned on to maintain the above pressure constant during the course of polymerization. The monomer was added until a solid content of about 25% by weight was reached, which required approximately 130 minutes. The pressure in the vessel was then released, the polymerization mixture was withdrawn and the polymer was separated from the liquid medium with a sieve. The product thus obtained was repeatedly washed, ground and then dried for 20 hours at 170° C. 25 kilograms of a white, freely flowing product were obtained having the following properties: density 2.164 g./cc., tensile strength 260 kg./cm.$^2$, elongation at break 380%, transparency 40.8%, thermostability 0.05%. The calculated space-time yield was 118 grams per liter an hour.

EXAMPLE 4

In the manner described in Example 2, a polymerization vessel having a capacity of 15 liters was charged with 9 liters of desalted water and 13.2 grams of ammonium chloride. The apparatus and the liquid medium were scavenged with nitrogen until all oxygen had been removed. The temperature was adjusted to 19° C. and the stirring speed to 410 revolutions per minute. A solution of 60 milligrams of potassium permanganate in 900 milliliters of water was divided in three aliquots and 2 aliquots were added over a period of a few minutes to the liquid medium in the polymerization vessel. The gas space in the vessel was connected with a steel bomb containing commercial non-stabilized trifluorochloroethylene. The consumption of monomer was followed via a measuring diaphragm and with a balance. A good polymerization speed was maintained by slowly metering in the third aliquot of the permanganate solution. After 80 minutes about 720 grams of trifluorochloroethylene from the steel bomb had been consumed and the experiment was terminated. 10 liters of a milky white dispersion of polytrifluorochloroethylene were removed from the polymerization vessel. In a glass vessel with rapid stirrer the very stable dispersion was broken by vigorous stirring at a speed of 1,000 revolutions per minute and adding a dilute aluminum nitrate solution and the polymer was precipitated in the form of a very fine powder. The solid polymer was washed again and dried. The polymer melted at a temperature of from 217–220° C. The chlorine content of the product of 29.94% found by analysis corresponded practically to the theoretical value for pure polytrifluorochloroethylene of 30.44%.

EXAMPLE 5

2 moles (233 grams) of gaseous trifluorochloroethylene under an autogenous pressure of 3 atmospheres gauge and 10 moles (1,000 grams) of gaseous tetrafluoroethylene, likewise under a pressure of 3 atmospheres gauge, were introduced into a displacement vessel having a capacity of 100 liters (sealing liquid: water) and the two gases were mixed. The vessel of Example 2 was charged with 9 liters of water and 13.2 grams of ammonium chloride and the entire apparatus was scavenged as described above 7 times with nitrogen and 2 times with the above gas mixture. The connection with the displacement vessel was opened and the gas mixture kept under a pressure of 3 atmospheres gauge was brought into contact with the liquid medium. The polymerization temperature was 20° C. and the stirrer rotated at a speed of 400 revolutions per minute. Three times at intervals of 7 minutes a solution of 15 milligrams of potassium permanganate in 150 milliliters of water was added to the polymerization mixture whereby the polymerization was initiated. During the course of a further hour a solution of 15 milligrams of potassium permanganate in 500 milliliters of water was then slowly metered in. Half an hour later the experiment was terminated, the pressure was released and the vessel was emptied. A very fine white polymer powder was obtained. After washing and drying the yield amounted to 893 grams. The product had a chlorine content of 3.6%, from which the composition of the copolymer was calculated to be 11.8% by weight of trifluorochloroethylene and 88.2% of tetrafluoroethylene. The space-time-yield was 57.0 grams per liter an hour.

EXAMPLE 6

In the displacement vessel described in Example 5 a gas mixture of 82% by weight of tetrafluoroethylene and 18% by weight of hexafluoropropylene was prepared and the mixture was kept under a pressure of 3.8 atmospheres gauge. The polymerization vessel was charged with 9 liters of water and 13.2 grams of ammonium chloride and scavenged with nitrogen as described in Example 5. The polymerization of the monomer mixture was initiated at a temperature of 15° C. by adding two times 15 milligrams of potassium permanganate dissolved in a small amount of water. Next, a catalyst solution containing 1 milligram of potassium permanganate in 10 milliliters of water was continuously metered into the polymerization vessel at a rate such that a consumption of about 500 milliliters of solution was maintained per hour. The polymerization set rapidly and soon 100 to 150 grams of monomers were absorbed per liter an hour. After 115 minutes the decrease of monomer mixture in the displacement vessel indicated a solids content in the polymerization mixture of 18 to 20% by weight. The experiment was interrupted, the pressure in the vessel was released, the polymerization mixture was removed and the polymer was separated with a sieve. It was then washed with a very dilute sodium bisulfite solution, ground in the wet state and dried at 150–170° C. 1860 grams of polymer were obtained, from which an average space-time yield of 97 grams per liter an hour was calculated.

Infrared spectroscopic analysis of a sample of the polymer showed characteristic, well pronounced bands indicating the presence of $CF_3$ groups.

What is claimed is:

1. In a process for the manufacture of fluorine-containing polymers by homo- or copolymerizing fluorine-containing olefins of 2 to 12 carbon atoms in an aqueous medium in the presence of a polymerization catalyst, the improvement which comprises employing a polymerization catalyst consisting of a member selected from the group consisting of permanganic acid, manganic acid, hypomanganic acid, manganous acid, or a salt or non-salt of a manganese compound which is transformed into said acids under the polymerization conditions, in an amount of from 0.1 to 100 p.p.m. of the acid catalyst calculated on the aqueous polymerization medium.

2. The process of claim 1 wherein the catalyst is used in an amount of from 2 to 10 p.p.m. of the acid catalyst calculated on the aqueous polymerization medium.

3. The process of claim 1 wherein the catalyst is potassium permanganate.

References Cited

UNITED STATES PATENTS

| | | | |
|---|---|---|---|
| 2,634,260 | 4/1953 | Carnahan | 260—92.1 |
| 2,683,140 | 7/1954 | Howard | 260—92.1 |
| 2,751,376 | 6/1956 | Barnhart et al. | 260—92.1 |
| 3,088,941 | 5/1963 | Ihland | 260—92.1 |

HARRY WONG, JR., Primary Examiner

U.S. Cl. X.R.

204—159.22; 260—87.5, 87.7